United States Patent
Asente et al.

(10) Patent No.: US 10,019,817 B2
(45) Date of Patent: Jul. 10, 2018

(54) EXAMPLE-BASED EDGE-AWARE DIRECTIONAL TEXTURE PAINTING

(71) Applicant: Adobe Systems Incorporated, San Jose, CA (US)

(72) Inventors: Paul J. Asente, Redwood City, CA (US); Jingwan Lu, Santa Clara, CA (US); Michal Lukáč, Praha (CZ); Elya Schechtman, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/394,121

(22) Filed: Dec. 29, 2016

(65) Prior Publication Data
US 2017/0109900 A1    Apr. 20, 2017

Related U.S. Application Data

(63) Continuation of application No. 14/723,884, filed on May 28, 2015, now Pat. No. 9,536,327.

(51) Int. Cl.
| | |
|---|---|
| *G06T 11/00* | (2006.01) |
| *G06T 11/40* | (2006.01) |
| *G06T 11/60* | (2006.01) |
| *G06T 7/00* | (2017.01) |
| *G06F 3/048* | (2013.01) |
| *G06F 3/0484* | (2013.01) |

(Continued)

(52) U.S. Cl.
CPC ........ *G06T 11/001* (2013.01); *G06F 3/04845* (2013.01); *G06T 7/13* (2017.01); *G06T 7/529* (2017.01); *G06T 11/40* (2013.01); *G06T 2200/24* (2013.01)

(58) Field of Classification Search
CPC combination set(s) only.
See application file for complete search history.

(56) References Cited

U.S. PATENT DOCUMENTS 8,249,365 B1 *  8/2012  Winnemoeller ...... G06T 11/001
                                                      382/181
9,536,327 B2     1/2017  Asente et al.
(Continued)

OTHER PUBLICATIONS

"Pre-Interview Communication", U.S. Appl. No. 14/723,884, dated Jun. 2, 2016, 3 pages.

(Continued)

*Primary Examiner* — Wesner Sajous
(74) *Attorney, Agent, or Firm* — Wolfe-SBMC

(57) ABSTRACT

Example-based edge-aware directional texture painting techniques are described. Inputs are received that define a target direction field and a plurality of edges as part of a target shape mask. A texture is synthesized from a source image by the computing device to be applied to the set of pixels of the target mask using a source shape mask and a source direction field. The source shape mask defines a plurality of edges of the source mask such that the synthesized texture applied to the plurality of edges of the target shape mask correspond to respective ones of the plurality of edges of the source shape mask. The source direction field is taken from the source image such that the synthesized texture applied to the target direction field corresponds to the source direction field. The pixels in the user interface are painted by the computing device using the synthesized texture.

20 Claims, 12 Drawing Sheets

(51) Int. Cl.
*G06T 7/13* (2017.01)
*G06T 7/529* (2017.01)

(56) References Cited

U.S. PATENT DOCUMENTS

| | | | | |
|---|---|---|---|---|
| 2005/0168476 | A1* | 8/2005 | Levene | G06T 11/60 345/582 |
| 2013/0083021 | A1* | 4/2013 | Cohen | H04N 13/0246 345/420 |
| 2013/0120433 | A1* | 5/2013 | DiVerdi | G06T 11/001 345/593 |
| 2016/0350942 | A1 | 12/2016 | Asente et al. | |

OTHER PUBLICATIONS

"Notice of Allowance", U.S. Appl. No. 14/723,884, dated Aug. 24, 2016, 9 pages.

\* cited by examiner

EXAMPLE-BASED EDGE-AWARE DIRECTIONAL TEXTURE PAINTING

RELATED APPLICATIONS

This patent application is a continuation of and claims priority to copending U.S. patent application Ser. No. 14/723,884, filed on May 28, 2015, the disclosure of which is incorporated herein by reference in its entirety.

BACKGROUND

Example-based texture painting presents a way for users to create content in user interfaces (e.g., raster graphics) that mimics visual characteristics of an arbitrary input texture defined by a source, in lieu of simple stamp brushes or other such graphical primitives. A user, for instance, may select an arbitrary input texture (e.g., cloth) and then paint an area of a user interface to have that texture painted to the area.

Conventional techniques that are used to perform this texture painting, however, do not fit well with other tools commonly used in the user interface (e.g., raster graphic tools) and thus require specialized knowledge on the part of a user. Additionally, the conventional techniques do not transfer enough of the salient visual characteristics of an input texture with sufficient fidelity, thereby looking unnatural to a user. Further, these conventional techniques do not support arbitrary shapes, which could be limiting and frustrating to a user of these conventional techniques.

SUMMARY

Example-based edge-aware directional texture painting techniques are described. In one or more implementations, inputs are received by the computing device to paint a target mask in a user interface that defines a set of pixels to be synthesized. The inputs define a target direction field and a plurality of edges as part of a target shape mask. A texture is synthesized from a source image by the computing device to be applied to the set of pixels of the target mask using a source shape mask and a source direction field. The source shape mask defines a plurality of edges of the source mask such that the synthesized texture applied to the plurality of edges of the target shape mask correspond to respective ones of the plurality of edges of the source shape mask. The source direction field is taken from the source image such that the synthesized texture applied to the target direction field corresponds to the source direction field. The set of pixels in the user interface are painted by the computing device using the synthesized texture.

In one or more implementations, a source mask is analyzed to determine a source direction field and a source shape mask that defines a plurality of edges of the source mask. A texture is synthesized to be applied to a set of pixels of a target mask using the source shape mask that defines a plurality of edges of the source mask such that the synthesized texture applied to a plurality of edges of a target shape mask of the target mask correspond to the plurality of edges from the source shape mask. The source direction field is taken from the source image such that the synthesized texture applied to the source direction field follows a target direction field of the target mask. The set of pixels are painted in the user interface by the computing device using the synthesized texture.

In one or more implementations, a system includes a source analysis module implemented at least partially in hardware to analyze a source image to determine a source direction field and a source shape mask that defines a plurality of edges of the source mask. The system also includes a user interaction module implemented at least partially in hardware to receive one or more inputs to paint a target mask in a user interface that defines a set of pixels to be synthesized, the one or more inputs defining a target direction field and a plurality of edges as part of a target shape mask. And further, the system includes a direction and edge aware synthesis module implemented at least partially in hardware to synthesize a texture from a source mask taken from the source image to be applied to the set of pixels from the source shape mask such that the plurality of edges of the target shape mask correspond to the plurality of edges from the source shape mask and the source direction field such that a direction of the synthesized texture taken from the source direction field follows the target direction field.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
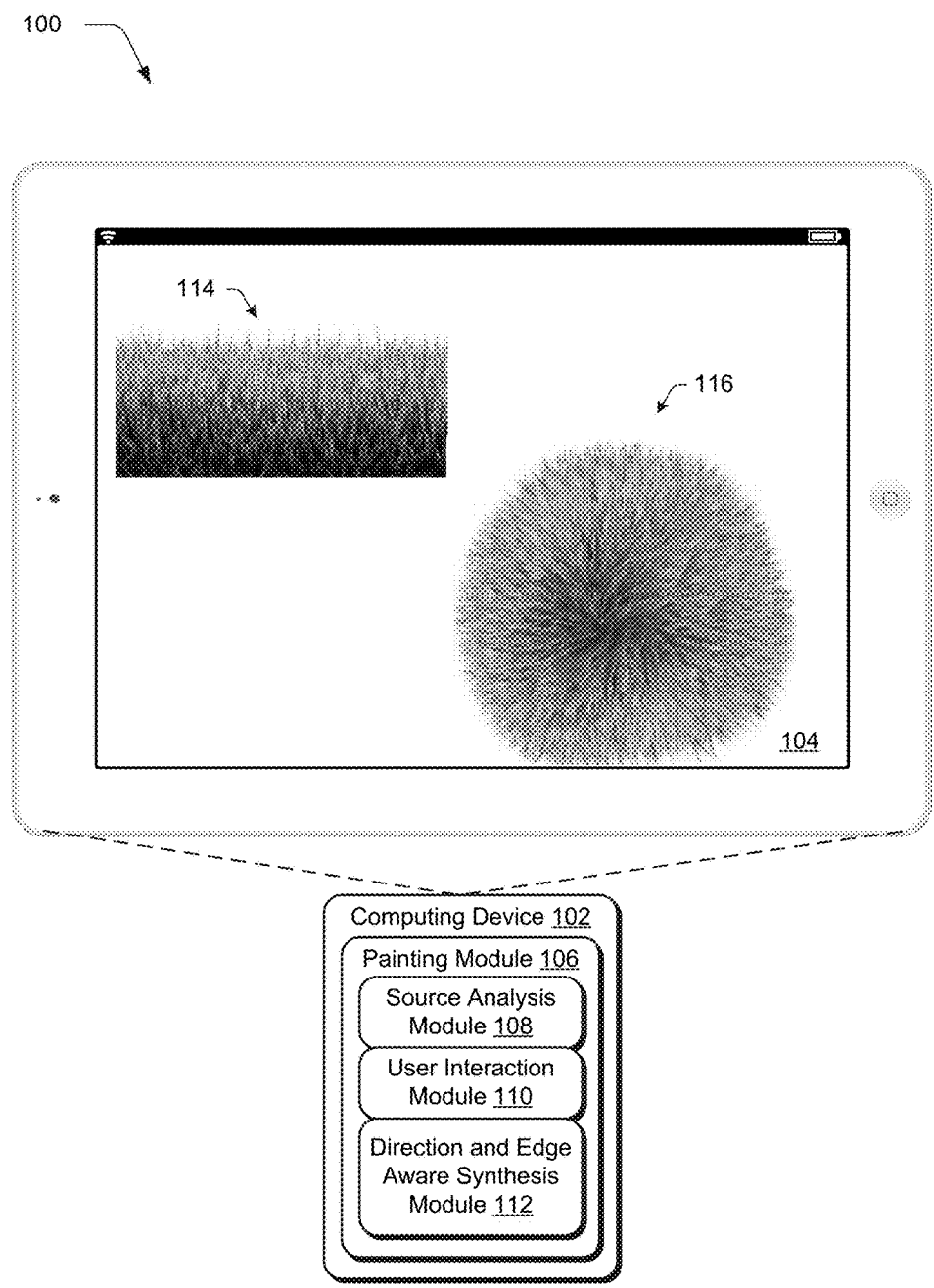
FIG. 1 is an illustration of an environment in an example implementation that is operable to employ source-based edge-aware texture painting techniques described herein.

Example-based texture painting is used to paint a texture from a source to a target, e.g., such as to paint a plaid fabric pattern from a shirt in a source image to a blanket in a target image. Conventional techniques used to perform such texture painting, however, do not support use of arbitrary shapes, require use of a plurality of specialized tools, and do not achieve natural looking results.

Example-based edge-aware directional texture painting techniques are described. In one or more implementations, techniques are described that preserve and synthesize direction in directional textures (e.g., grass, fur, weathered wood) in accordance with user-specified constraints and mimic salient visual characteristics of the input texture with sufficient fidelity. To do so, a source image is first analyzed to determine directionality of a texture (and thus represents a texture orientation of an underlying texture in the source image) that is expressed as a source direction field and a source shape mask that describes texture within an area as well as defined edges to the area.

A user then paints a user interface (e.g., brushing with a virtual brush) to define the target direction field based on the direction of the brush strokes and well as an area to be painted. The painting thus defines a target shape mask having defined edges along a boundary of the target shape mask. Further, through successive inputs (e.g., brush strokes) a user may refine a shape and directionality of a set of pixels to which the texture is to be applied. Other examples of sources of local directionality are also contemplated, such as an external edge map.

A texture is then synthesized such that directionality of the source direction field follows directionality of the target direction field and edges from the source and target shape masks correspond to each other. For example, the edges may originate from a contour of a source image object that is matched to a contour of a brush stroke. This may be performed using a shape descriptor (e.g., shape context) in order to form an output contour that has a coarse shape defined by the shape of brush strokes from the painting and fine shape detail originated from source image contours.

In this way, arbitrary target shapes may be painted using texture taken from a source image that follow directionality of the source image as well as characteristics of textures at corresponding edges. Thereby, these techniques provide a natural look and feel to the target image to which the synthesized texture is applied. A variety of other examples are also contemplated, further discussion of which is included in the following sections and shown in corresponding figures.

In the following discussion, an example environment is first described that may employ the source-based edge-aware texture painting techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ source-based edge-aware texture painting techniques described herein. The illustrated environment 100 includes a computing device 102 having a display device 104, on which, a user interface may be displayed to support user interaction.

The computing device 102 may be configured in a variety of ways. The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 12.

The computing device 102 is illustrated as including a painting module 106. The painting module 106 is representative of functionality of the computing device 102 to paint textures in a user interface, an example of which is displayed by the display device 104. In this example, the painting module 106 supports source-based edge aware directional texture painting, which is implemented using a source analysis module 108, a user interaction module 110, and a direction and edge aware synthesis module 112.

The source analysis module 108 is representative of functionality to analyze a source 114. The user interaction module 110 is representative of functionality to receive and interpret user inputs that define an area of pixels of a target 116 that is to be painted, e.g., through brush strokes. The direction and edge aware synthesis module 112 is representative of functionality to synthesize a texture for the pixels of the target 116. This is performed by taking into account edges as well are directionality of the texture of both the source and target, which may be used to support arbitrary shapes, further discussion of which is included in the following and shown in a corresponding figure.

Figure 2:
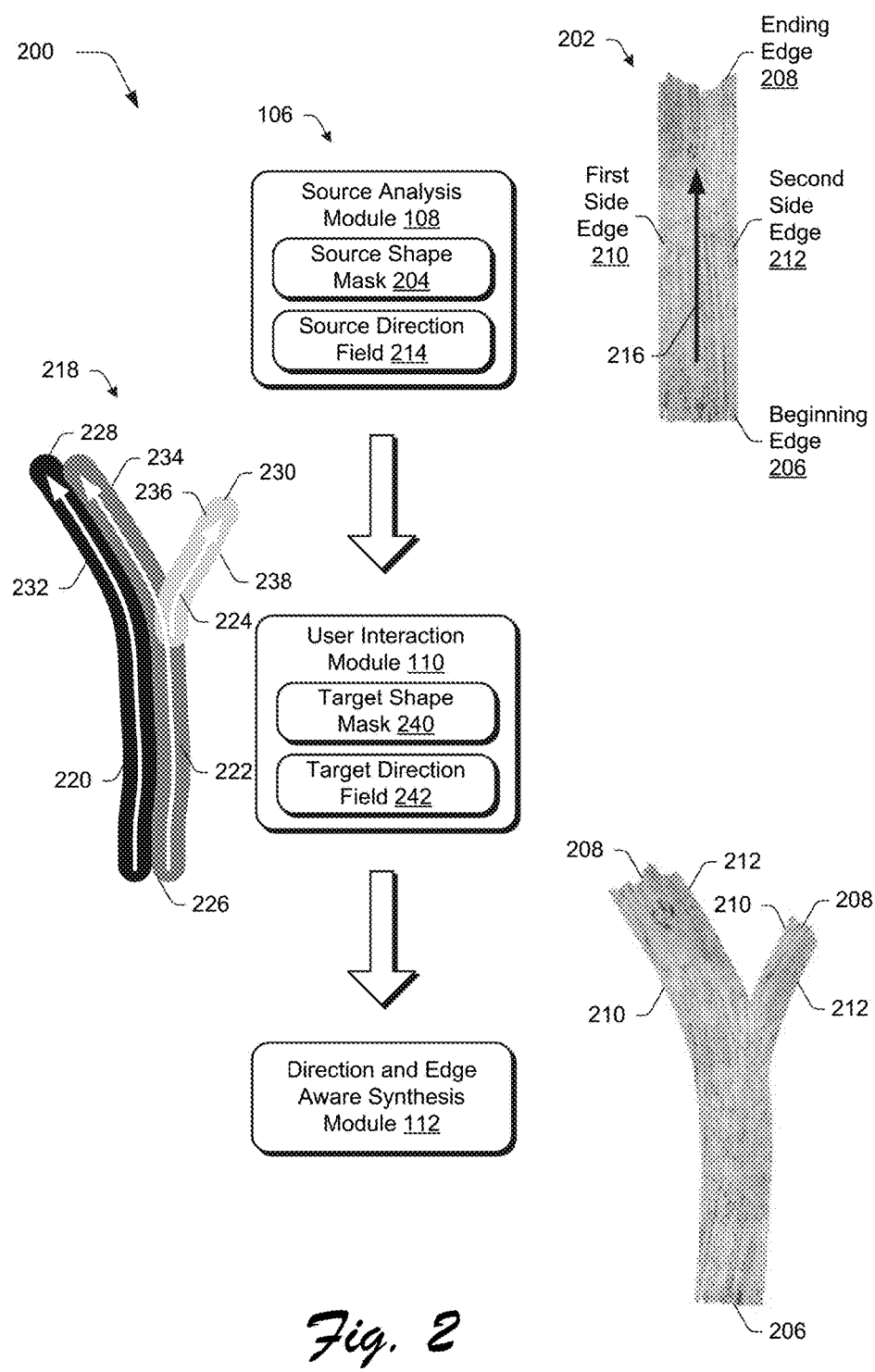
FIG. 2 depicts an example system showing a workflow as implemented by components of a painting module of FIG. 1.

FIG. 2 depicts an example system 200 showing a workflow as implemented by components of the painting module 106 of FIG. 1. The user in this example specifies a source image (e.g., RGB or other image) and uses interactive image segmentation and matting to extract an area of interest along with the opacity values, which is referred to as a source mask 202 in the following to represent a portion of the source image that is used as an example for texture that is to be applied to a target region. The resulting source mask 202 "S" then serves as a basis for further processing.

Initially, pixels are taken from the source mask 202 "S" with non-zero alpha to form a binary source shape mask 204. The source shape mask 204 defines an area having texture that is to be used to synthesize texture to a target mask. The source shape mask 204 is also configured to track respective edges of the source shape mask 204, which may be used to provide a natural look and feel to the painted texture.

As is readily observed for the illustrated source mask 202, each of the edges have different texture characteristics in this illustration, e.g., a beginning edge has a relatively flat shape and uniform color while an ending edge 208 has both a broken edge along with greater differences in color. Even for the relatively flat first and second side edges 210, 212, differences in shading in a flow of grain in the wood may be observed by comparing the two.

Accordingly, by describing these characteristics as part of the source shape mask 204, the characteristics may be applied to a target as further described below. The source analysis module 108 may also accept inputs from a user to specify an edge extent, e.g., how wide boundary effects are to be applied from respective edges of the source mask 202.

The source direction field 214 describes a direction 216 exhibited by the texture in the source mask 202, e.g., a beginning and an end as illustrated through use of an arrow in the figure. This may be determined in a variety of different ways, such as orthogonal to gradient as further described in the direction analysis section below.

The user interface module 110 is representation of functionality to accept inputs from a user to define a set of pixels to be painted in a user interface, which is referred to as a target mask 218 in the following. The user, for instance, may interact with a painting tool of the user interaction module 110 to make first, second, and third brush strokes 220, 222, 224 in succession. The brush strokes, together, define a target shape mask 210 "$M_t$" of a set of pixels that are to be painted with a texture along with edges 226, 228, 230, 232, 234, 236, 238 of a boundary of a target shape mask 240.

A direction of the brush strokes 220, 222, 224 is used to define a target direction field 242 for the target mask 218, as illustrated through the use of arrows in the figure. In this way, a user may easily define a set of pixels in an area to be painted (i.e., the target mask 218), edges of the area, and directionality of a texture to be applied to the area through brush strokes in this example. Additionally, through use of successive brush strokes a combing process is supported in which a user may alter or refine a size of an area being painted as well as directionality within the area. Techniques may be used to combine these multiple strokes, such as through use of a direction diffusion technique as described in greater detail in a corresponding section below.

The source mask 202 having the source shape mask 204 and source direction field 214 and the target mask 218 having the target shape mask 240 and target direction field 242 are then processed by the direction and edge aware synthesis module 112 to synthesize a texture for the set of pixels of target mask 218. This includes aligning the source direction field 214 to follow the target direction field 242. This also includes configuration of edges of the source mask 202 with corresponding edges of the target mask 218.

In the illustrated example, edges 232, 236 of the target mask 218 correspond to the first side edge 210 of the source mask 202 and are textured as such. Likewise, edges 234, 238 of the target mask 218 correspond to the second side edge 212 of the source mask 202. The beginning and ending edges 206, 208 also correspond to edges 226, 228 based on directionality of the brush strokes 220, 222, 224. For example, this may be performed through use of a shape descriptor such that an output contour has a coarse shape origination from a shape of a brush stroke and fine shape details that originate from source image contours.

The source and target direction fields 214, 242 are also aligned such that a direction of the texture in the source mask 202 follows a direction of the texture in the target mask 218. Additional techniques are also employable by the direction and edge aware synthesis module 112, such as to use a coherence weighting mechanism to improve the final visual quality of the synthesized image "T" even under strong non-rigid deformation as further described below.

Figure 3:
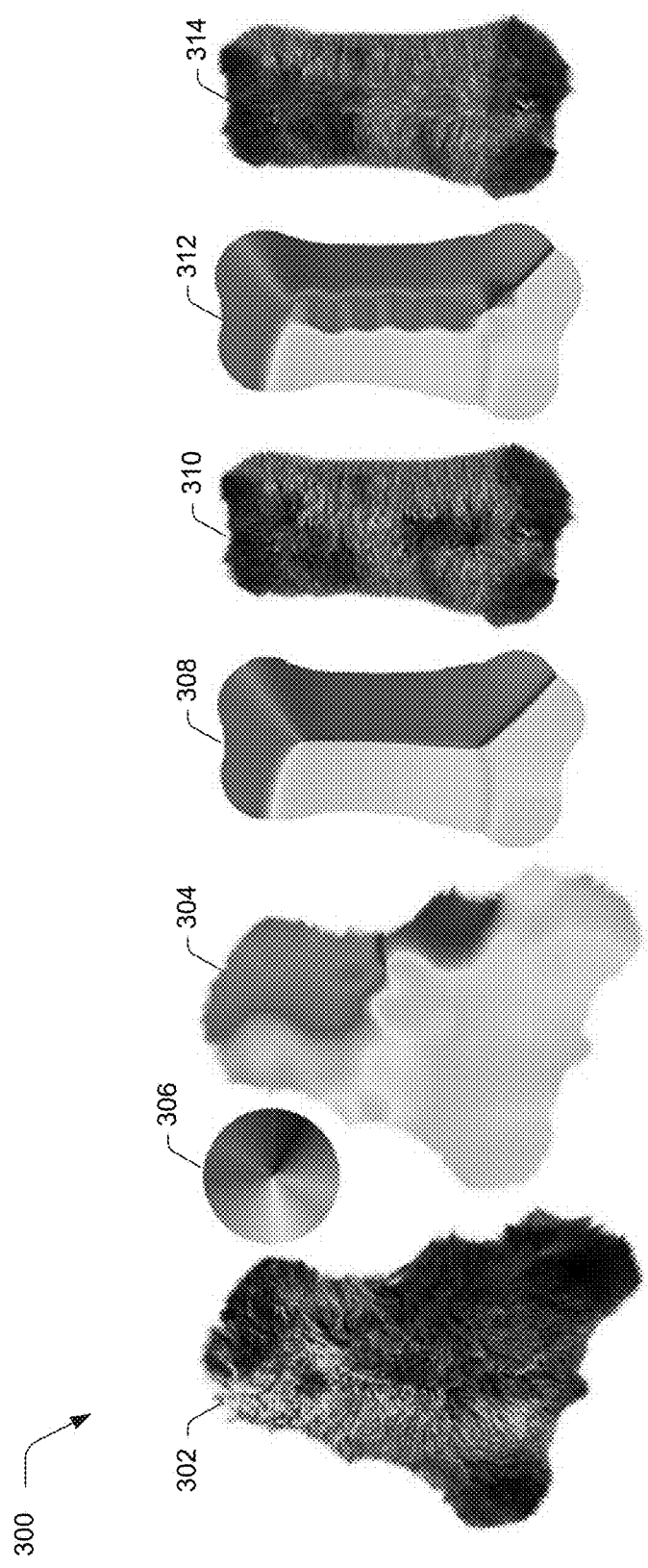
FIG. 3 depicts an example system showing a workflow as implemented by a source analysis module, user interaction module, and direction and edge aware synthesis module of FIG. 2.

FIG. 3 depicts an example system 300 showing a workflow as implemented by the source analysis module 108, user interaction module 110, and direction and edge aware synthesis module 112 of FIG. 2. An example of a source image 302 is shown that includes a fur-like texture. A detected source direction field 304 is then shown, with a direction wheel 306 for reference.

An example of user inputs 308 is also shown that defines a target shape mask 240 and target direction field 242. A result 210 of texture synthesis using the target shape mask 240 and target direction field 242 from the user inputs 308 is then shown which illustrates how a direction of the fur from the source follows a direction of the user inputs (e.g., brush strokes) made in defining the target shape mask and target direction field.

Additionally, a refined example 312 of a target direction field 242 (for the corresponding target shape mask 240) and corresponding result 314 is also shown that employs the direction diffusion technique, implementation of which is described in greater detail in a corresponding section below.

Direction Analysis

As described above, the source analysis module 108 is configured to determine a source direction field 214 for a source image. Accordingly, the first step is to create a source direction field "$d_s$" that specifies local direction at each of the pixels of a portion of the source image in this example, (e.g., the source mask 202 "S"), which is also referred to in the following simply as the "source." To support arbitrary input exemplars and have a self-contained approach, the source analysis module 108 determines the source direction field 214 using the RGB color information in this example but other examples are also contemplated.

A source direction field "$d_s$" may be locally smooth and perpendicular to a gradient field of "S", i.e., a tangent field. Because smoothness and perpendicularity are not satisfied simultaneously in some instances, additional filtering may be performed. The signs of the tangent vectors may also be taken into account, since the signs are semantically significant for many images as further described below.

Figure 4:
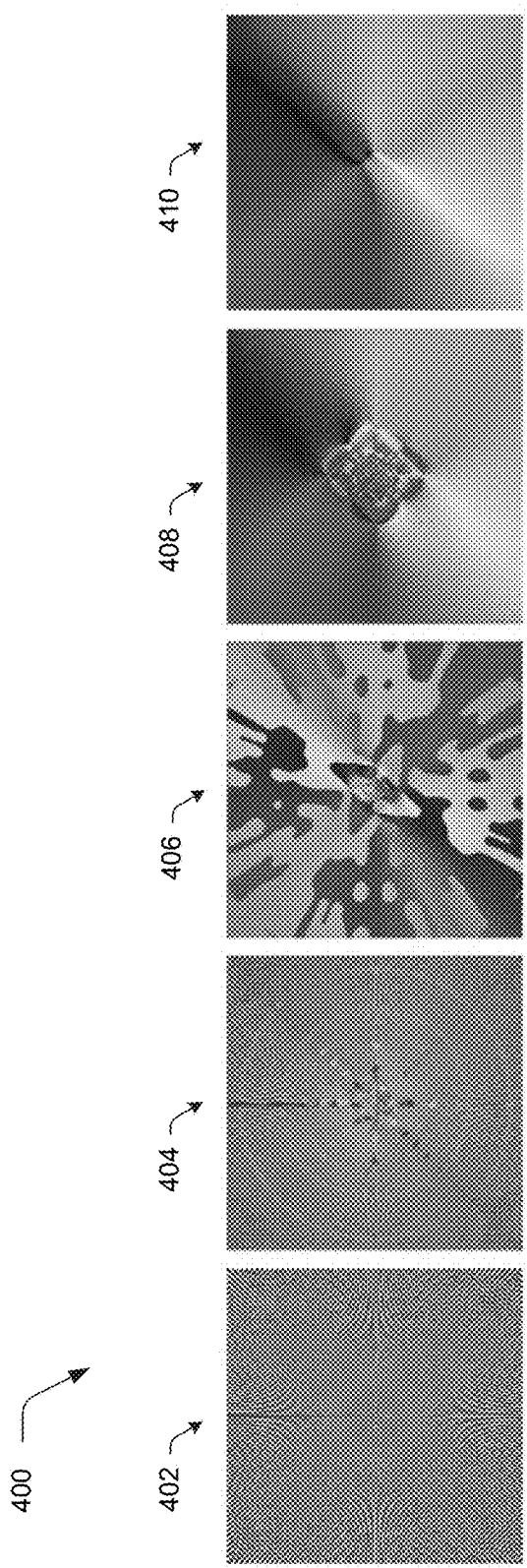
FIG. 4 depicts an example implementation showing orientation direction with and without unified tangent sign initialization.

FIG. 4 depicts an example implementation 400 showing orientation direction with and without unified tangent sign initialization. An original synthetic image 402 is shown followed by a false visualization 404 of an initial direction field gradients. A converged result 406 after a few ETF filter iterations is then shown. An initial direction field 408 using a unified tangent sign initialization is also illustrated using the techniques described in the following along with a result 410 after a single edge tangent flow (ETF) filter iteration applied on the unified tangent sign initialization 408.

Conventional approaches to estimate smooth tangent fields typically ignore a sign of the tangent vector, since the filters conventionally employed are symmetric with respect to the sign. In particular, a conventional multi-lateral filter uses a non-linear $\phi$ term to preserve the sign of the tangent vectors. In such a case, flipping the signs of some of the tangents in the initialization phase as shown for the initial direction field 408 does not affect the magnitudes or absolute direction of the tangents in the resulting tangent field, merely the corresponding signs. Thus, sign harmonization is solvable independently as a pre-processing pass and then a single filter is applied to get a coherent, smooth result 410.

Direction harmonization may be performed using an edge tangent flow (ETF) filter. For each pixel, an estimation is made of a tangent "$t_p'$" along with an example of the signs of already initialized tangents in a neighborhood "$\mathcal{N}_p$," setting the initial tangent "$t_p^0$" as follows:

$$t_p^0 = \begin{cases} t_p' & \text{if } \sum_{q \in N_p} t_p' \cdot t_q^0 \geq 0 \\ -t_p' & \text{otherwise} \end{cases} \quad (1)$$

A starting pixel is chosen with the greatest gradient magnitude (with respect to other pixels) and the gradient vector is rotated, e.g., ninety degrees to the left or right. From there, the signs are propagated along local tangent directions. Specifically, the propagation is implemented using an approach similar to a breadth-first search.

A priority map is maintained for each of pixels in the image, along with a queue of unprocessed pixels. Each of the priorities are initialized to zero, and the pixel with the highest gradient magnitude is added to a queue. Whenever a pixel is processed by evaluating Equation 1 above, it is marked as such, and the pixel's unprocessed four neighbors are added to the queue and the priorities of pixels along the tangent are increased. The algorithm then proceeds to the pixel in the queue with the highest priority.

The priority update ensures that search propagates along the tangents associated with the strongest gradients. To this end, an elongated Gaussian kernel aligned with the local tangent is projected into the bitmap and used to determine the increase in priority. In one or more implementations, the width is set along the tangent to the width of the ETF filter, the width in the orthogonal direction to one, and the amplitude is set to the magnitude of the gradient of the processed pixel.

Direction Diffusion

Figure 5:
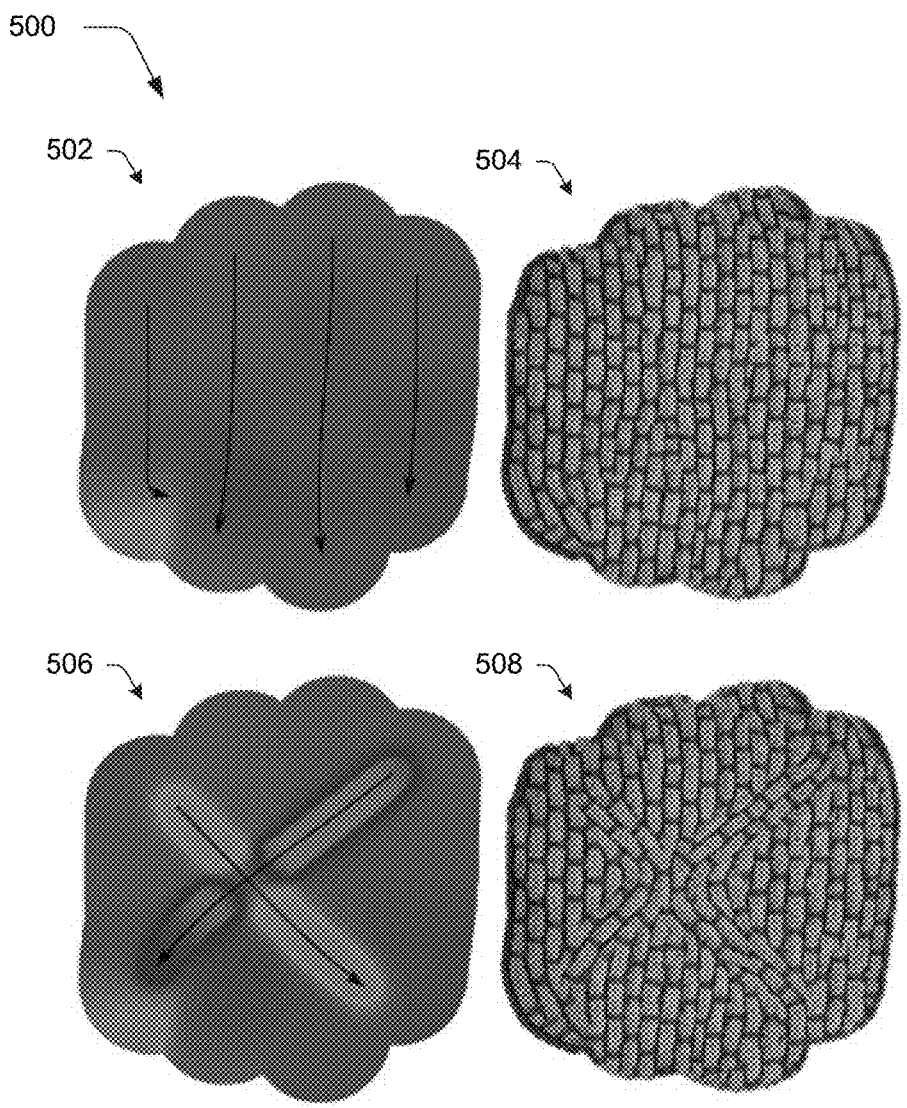
FIG. 5 depicts an example implementation of direction field authoring and refinement.

FIG. 5 depicts an example implementation 500 of direction field authoring and refinement. A direction field 502 of brush strokes made with a 120 pixel wide brush is illustrated proximal to a texture synthesis result 504 as a generally longitudinally directed texture. A directional field 506 made using two eighty pixel wide brush strokes that refines the previous strokes to the texture synthesis result 504 is also shown. The refinement forms the texture synthesis result 508 having an "X" directional texture. Thus, in the techniques described herein, a user is given explicit control over texture direction through directional painted inputs, e.g., brush strokes.

Therefore, given a region painted by a user (e.g., with a variable-width brush), a target direction field "$d_t$," is formed that assigns a direction to each pixel in the region that is painted, i.e., the target mask 218 of FIG. 2. In conventional approaches, on the other hand, a texture direction is defined implicitly from a color domain so as to match boundary conditions and thus is limited to this definition and is not user controlled.

To form the target direction field 242, a user-specified one dimensional stroke path with an instantaneous direction at every path sample is defined as part of a user input, e.g., a brush stroke. The sparse direction samples are propagated to the entire stroke area. As an act of painting, the effect of brushing is local, and its influence may be strictly limited to the area within the brush footprint leaving the rest of the image unaffected. To avoid synthesis artifacts, checks are performed to ensure that discontinuities are not created in the direction field at a brush boundary and that the target direction field has a similar level of smoothness to the direction field of the input.

Conventional approaches use various optimization processes to construct a smooth direction field from sparse user-specified constraints that are global by nature and do not provide for a localized, controlled way to combine new strokes with an existing direction field. Thus, these conventional techniques do not support combing and general refinement in which a user may refine both size and direction of a target mask 218 through successive inputs, e.g., brush strokes.

In the following, a kernel-based diffusion scheme is used to smoothly diffuse and blend the direction of an arbitrary number of strokes of variable radius, while also permitting blending with a pre-existing field. For example, given a stroke path "K" of each of the points "k∈K," the direction "$d_k(p)$" diffused from the stroke at a point "p" is calculated as follows:

$$d_k(p) = \frac{1}{w_k(p)} \int_{k \in K} G(\| p - k \|^2, \sigma_k^2) \cdot d'(k) \quad (2)$$

where "$G(x, \sigma_k^2)$" is a Gaussian kernel with a standard deviation set to half a stroke width, "d'(k)" is the local normalized tangent, and $$w_k(p) = \int_{k \in K} G(\|p-k\|^2, \sigma_k^2) \quad (3)$$

This yields a smooth interpolation that can be evaluated analytically if the input stroke is approximated as a polyline, and the generalization to multiple simultaneous strokes is straightforward as shown for the direction field 502 and texture synthesis result 504 of FIG. 5.

In order to combine the diffused direction of a current stroke with an aggregated direction field of the previous strokes as shown for the direction field 506 and texture synthesis result 508, a convex mix is calculated of the previous value "$d^{n-1}(p)$" with "$d_k(p)$" as in the following:

$$d^n(p) = w_s(p) \cdot d_s(p) + (1 - w_s(p)) \cdot d^{n-1}(p) \quad (4)$$

assuming "$w_s(p)$" is clamped to remain in the convex interval ⟨0, 1⟩.

Source-Based Synthesis

Once source and target direction fields "$d_s$" and "$d_t$" are prepared, the direction and edge aware synthesis module 112 of FIG. 2 proceeds towards the synthesis phase to generate an output image while respecting the principles of edge and direction awareness as described earlier.

A variety of techniques are usable to perform texture synthesis, one example of which is a patch-based optimization framework. This framework is flexible and supports substantial alterations to its behavior to include a patch distance measure and corresponding patch voting logic as described in the following.

Edge-awareness is introduced into the synthesis by adding a shape distance term to the energy function in order to minimize:

$$E(T, S) = \sum_{q \in T} \min_{p \in S} (D_{patch}(p, q) + \lambda D_{shape}(p, q)) \quad (5)$$

The value "$D_{patch}(p,q)$" measures the color distance of patches and "$D_{shape}(p,q)$" defines the distance of local shapes around pixels "p∈S" and "q∈T."

Direction awareness is implemented on the level of these distance measures by making the measures account for local direction at both "p" and "q." This is performed by introducing a rotation operator "$\varnothing \alpha_{pq}$," which rotates the local frame of reference for the patch or shape descriptor by the difference in local direction at "p" and "q," i.e., "$\alpha_{pq} = d_t(q) - d_s(p)$."

The color distance is then calculated as the direction-aware sum of squared differences as follows:

$$D_{patch}(p,q) = \| P_p^s - P_q^t \varnothing \alpha_{pq} \|^2 \quad (6)$$

between the source patch $P_p^s$ centered on $p \in S$ and the rotated target patch "$P_q^{t'}$" centered on "$q \in T$." Similarly, the direction-aware shape distance is evaluated as:

$$D_{shape}(p,q) = \chi^2(H_p^s, H_q^{t'} \oslash \alpha_{pq}) \quad (7)$$

i.e., the distance between source and target shape hint histograms described below, which introduce shape awareness by considering both the spatial distance from the texture boundary, and its shape relative to the local direction field.

Alpha Channel

An alpha mask may be added as an additional pixel channel to further improve the quality of the synthesis at added boundaries. This has two effects, to synthesize opacity may help guide synthesis towards a solution where pixels close to boundaries in the source are more likely to be matched with boundary pixels in the target.

Optimization

To minimize Equation (5) above an expectation-maximization optimization may be used that involves alternating search and voting steps on an image patch pyramid in a coarse-to-fine order. To improve texture coherence and richness in the synthesized image, an improvement may be made to the voting step to take both local nearest-neighbor field coherency and the color histograms of both images into account. When evaluating the final color "$C(p)$" of a pixel "$p$," iteration is performed through the overlapping patches mapped to its neighborhood and a weighted average is calculated of the candidates "$c_x$" gathered from the neighborhood as follows:

$$C(p) = \frac{\sum_{q \in N_p} w_c(q) \cdot w_h(q) \cdot C(q)}{\sum_{q \in N_p} w_c(q) \cdot w_h(q)} \quad (8)$$

where "$w_h$" is a color histogram weight of the candidate pixel and "$w_c$" is the coherence weight, which serves to propagate coherent arrangements of patches from the source. The histogram weight promotes pixel candidates with relatively underrepresented colors, improving the diversity of the synthesized image.

Figure 6:
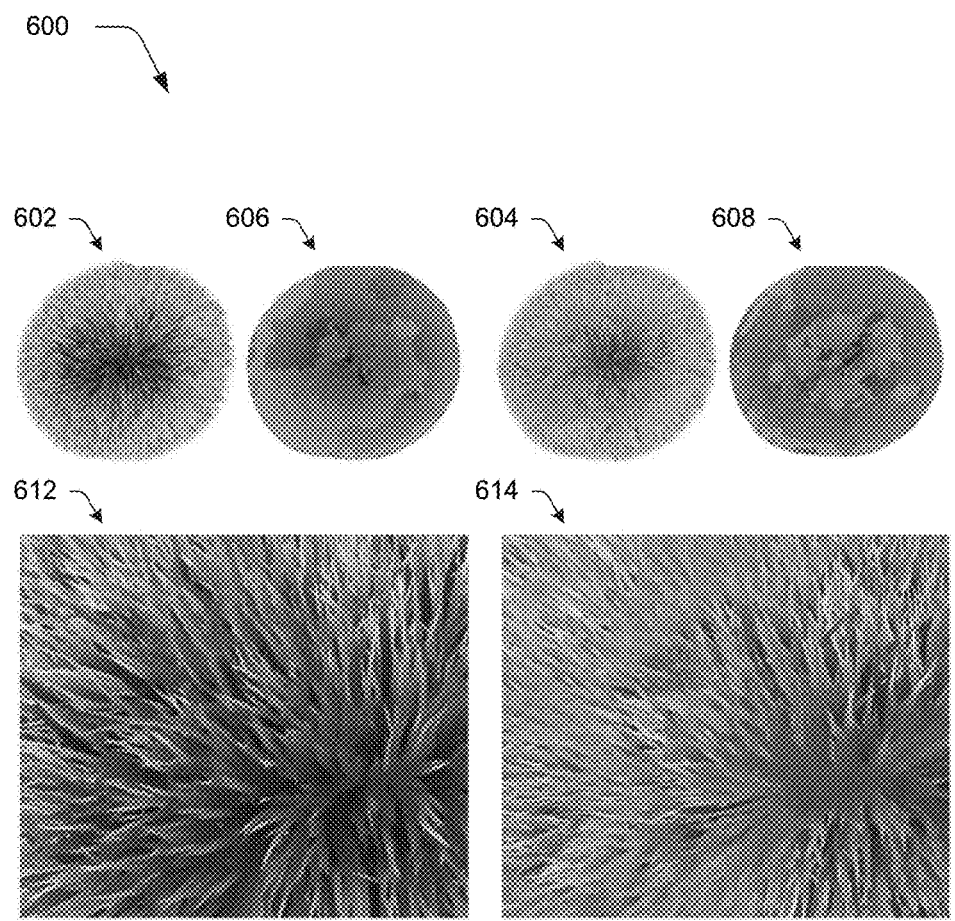
FIG. 6 depicts an example implementation showing comparison of results and corresponding nearest neighbor fields synthesized with a coherence weight and without a coherence weight.

FIG. 6 depicts an example implementation 600 showing comparison of results 602, 604 and corresponding nearest neighbor fields 606, 608 synthesized with a coherence weight (e.g., results 602 and nearest neighbor field 606) and without a coherence weight (e.g., results 604 and nearest neighbor field 608). Details of individual blades are thus better preserved with the coherence weight as shown in example 612 than without the coherence weight as shown in example 614.

A coherence weight is included since free-form rotations of the texture tend to induce non-rigid mapping in the nearest neighbor field, which in turn causes blurry and visually displeasing results as shown in FIG. 6. By increasing the weight of coherently-mapped configurations of patches, formation of larger, coherently mapped areas over multiple iterations is encouraged, which preserves high-frequency detail and causes less blurring.

To calculate the coherency weight, the coherence of mapped pixel configurations is examined as follows. In effect, a nearest-neighbor match is a rigid mapping from "T" to "S." The matched coordinates and relative rotation at a pixel "q" thus define a mapping "$R_q$," which maps the pixel grid in "T" to a rotated and offset pixel grid in "S." Because the optimization is based on an assumption that these mappings are approximately identical for the group of pixels within the area of a patch, the coherency measure is designed as a quantification of how this assumption holds. To evaluate this measure, the patch neighborhood of a pixel $q_0$ and the induced mappings therein is examined as follows:

$$w_c(q_0) = \sum_{q \in N_{q_0}} G(\| R_{q_0}(q) - R_q(q) \|^2, \sigma_c^2) \quad (9)$$

where "$\sigma_c^2$" is a coherency range, which is set to two throughout in this example. Multiplying these weights, along with the guaranteed range on both of them, ensures that the weighting scheme degenerates gracefully in any edge case.

Figure 7:
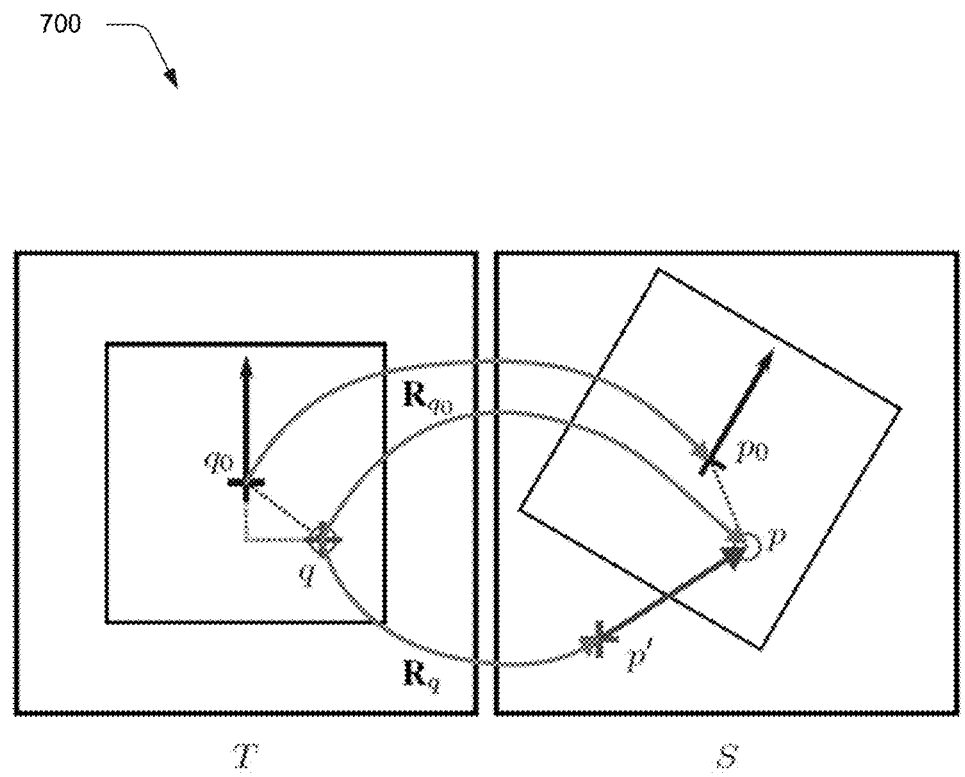
FIG. 7 depicts an example of calculation of coherence of a patch.

FIG. 7 depicts an example 700 of calculation of coherence of a patch. In order to calculate coherence, an examination is made of each of the pixels "q" in a patch around a pixel "$q_0$ in the target image "T." The position of pixel "q" is projected into the pixels "p" and "p'" in the source image "S" using both the rigid transformation induced by the match at "$q_0$: $p = Rq0 (q)$" and its own transformation: "$p' = Rq(q)$." The more coherent the matching, the lower the sum of distances "$\|p-p'\|$."

Example Results

Figure 8:
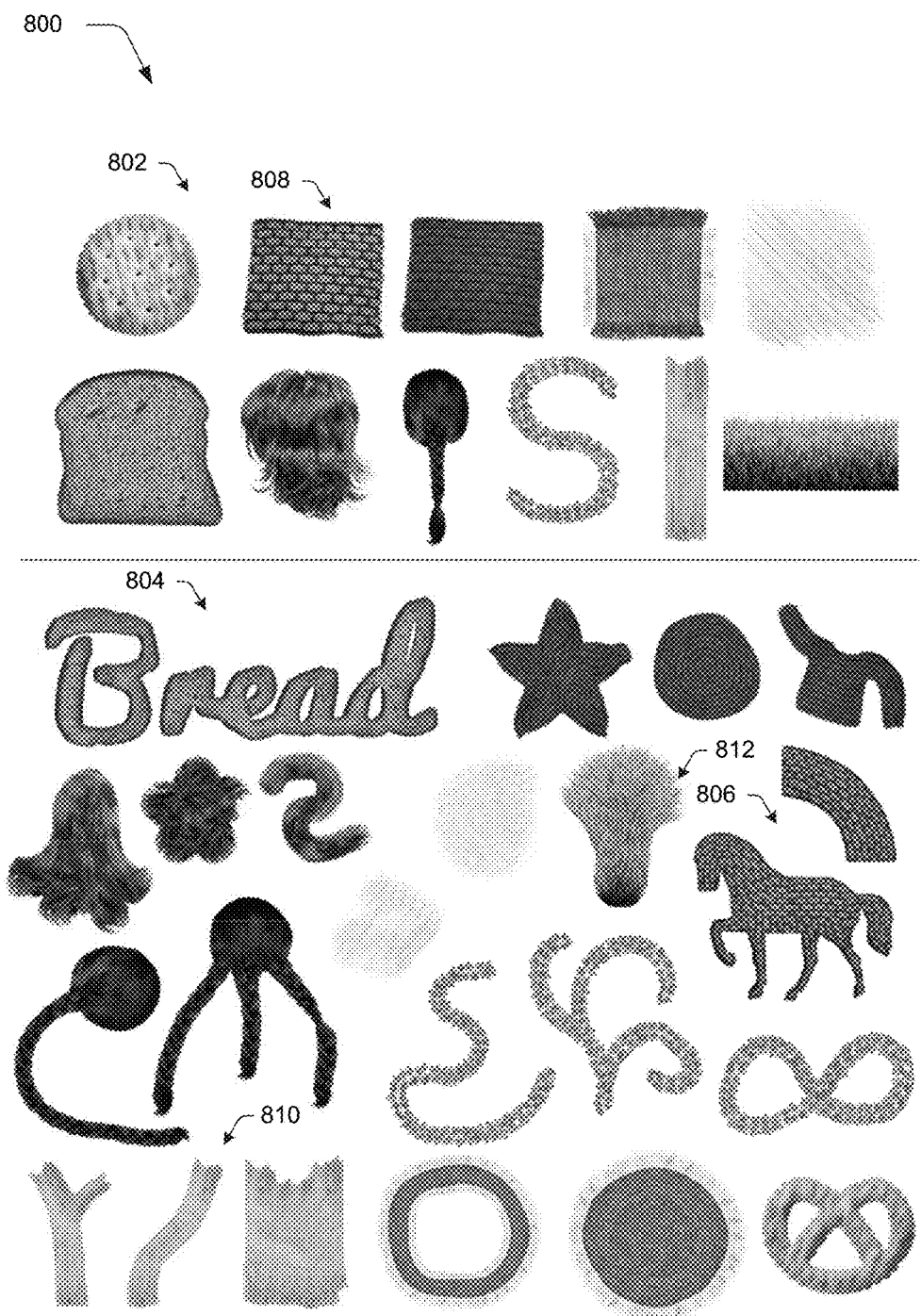
FIG. 8 depicts an example implementation showing sources and results of texture painting that supports arbitrary shapes.

FIG. 8 depicts an example implementation 800 showing sources 802 and results 804 of texture painting that supports arbitrary shapes. The sources 802 includes a cracker, crochet, denim, sample of color pencil, bread, a wig, braided hair, ornamental leaves, plank, and grass. As shown in the crochet result 806 of a horse, the techniques described herein are capable of coherently synthesizing textured outputs with direction configurations not present in the original source 808, e.g., different directions and arrangements.

The effect of edge and direction awareness is illustrated by the plank example 810, which demonstrates use of semantically correct edge features according to local direction. The grass 812 example shows that transparency is correctly synthesized both on the boundary and in the interior.

Figure 9:
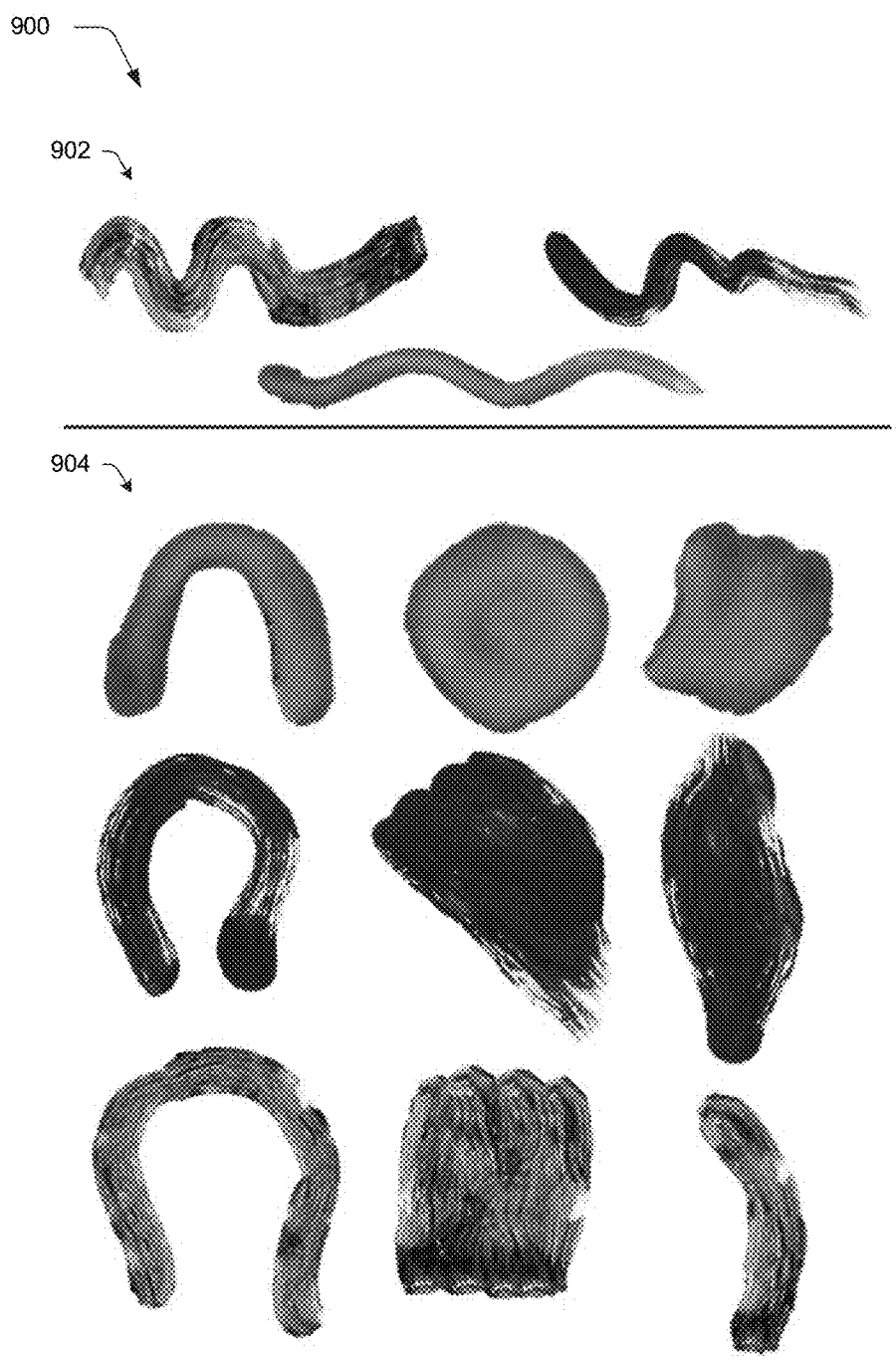
FIG. 9 depicts an example implementation showing sources of paint brush strokes and synthesized textures having regions of arbitrary shapes.

FIG. 9 depicts an example implementation 900 showing sources 902 of paint brush strokes and synthesized textures 904 having regions of arbitrary shapes. In this example, the sources 902 may be used to fill relatively large areas, which is not performable using conventional techniques.

Figure 10:
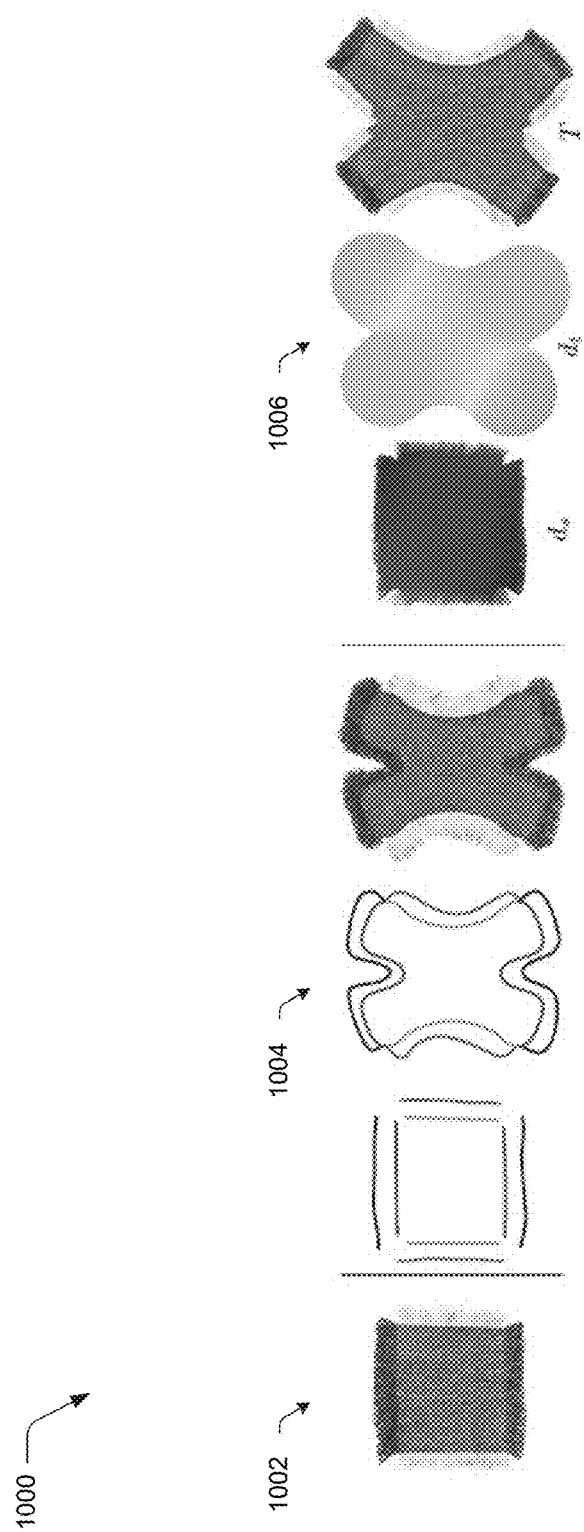
FIG. 10 depicts an example implementation showing comparison of a conventional paint-by-feature technique and the techniques described herein.

FIG. 10 depicts an example implementation 1000 showing comparison of a conventional paint-by-feature technique and the techniques described herein. In this example, a source 1002 is an image of a carpet with tassels. A conventional paint-by-feature technique 1004 has difficulty handling wide edges like the tassels and the transition from the edge to the interior is messy in some areas. Using the techniques described herein, however, results 1006 are achieved that support a seamless transitions from edges to an interior with a natural looking result.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-10.

Figure 11:
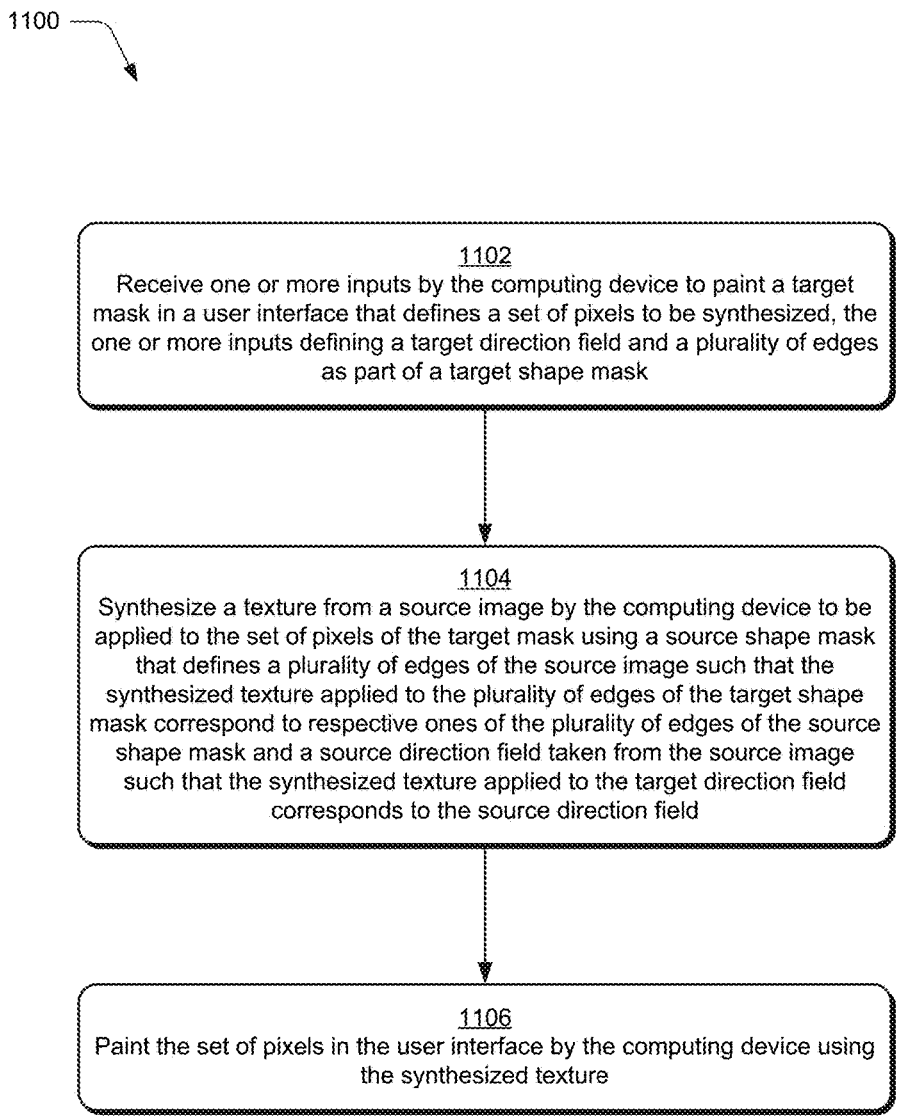
FIG. 11 is a flow diagram depicting a procedure in an example implementation of source-based edge-aware texture painting techniques described herein.

FIG. 11 depicts a procedure 1500 in an example implementation of source-based edge-aware texture painting techniques described herein. One or more inputs are received by the computing device to paint a target mask in a user interface that defines a set of pixels to be synthesized. The one or more inputs define a target direction field and a plurality of edges as part of a target shape mask (block 1102). A user interaction module 110, for instance, may receiving inputs defining brush strokes that that define an area being painted as well as a direction of the strokes applied to that area.

A texture is synthesized from a source image by the computing device to be applied to the set of pixels of the target mask using a source shape mask and a source direction field. The source shape mask defines a plurality of edges of the source image such that the synthesized texture applied to the plurality of edges of the target shape mask correspond to respective ones of the plurality of edges of the source shape mask. The source direction field is taken from the source image such that the synthesized texture applied to the target direction field corresponds to the source direction field (block 1104).

The source image, for instance, is utilized to supply the texture to the target mask. The source image (e.g., or a portion thereof as defined by a source mask 202) also includes directions and edges defined by a source shape mask 204 and source direction field 214, respectively. Thus, these edges and directions may be used to match the texture from the source mask to the target mask. The set of pixels in the user interface are then painted by the computing device using the synthesized texture (block 1106). A variety of other examples are also contemplated as described above.

Example System and Device

Figure 12:
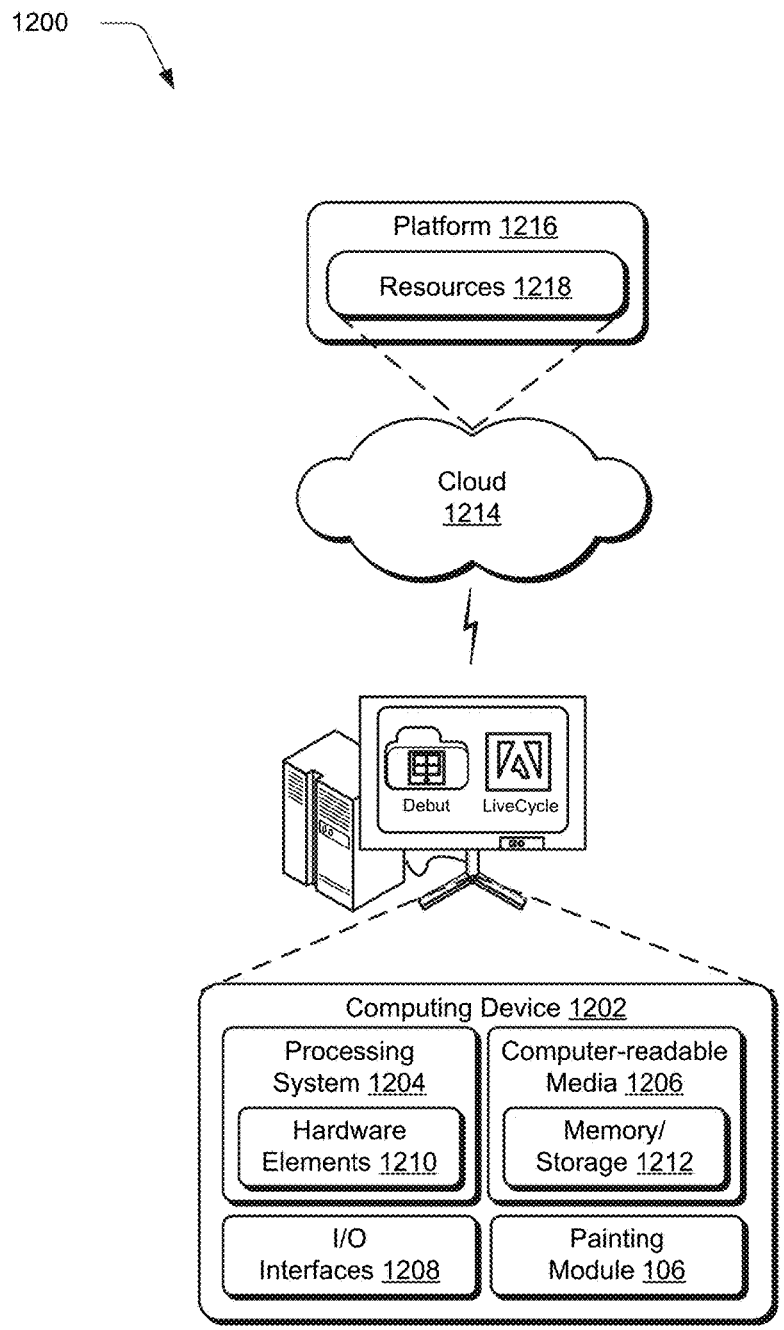
FIG. 12 illustrates an example system including various components of an example device that can be implemented as any type of computing device as described and/or utilize with reference to FIGS. 1-11 to implement embodiments of the techniques described herein.

FIG. 12 illustrates an example system generally at 1200 that includes an example computing device 1202 that is representative of one or more computing systems and/or devices that may implement the various techniques described herein. This is illustrated through inclusion of the painting module 106. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method of controlling example-based directional texture painting by a computing device, the method comprising:
   receiving, by the computing device, a source direction field of a source texture to be applied to a set of pixels to be synthesized;
   receiving, by the computing device, at least one input painting a target direction field in a user interface to be applied to the set of pixels;
   synthesizing, by the computing device, the set of pixels using the source texture and the source direction field such that the target direction field of the synthesized set of pixels corresponds to the source direction field;
   receiving, by the computing device, at least one subsequent input painting an update to the target direction field; and
   updating, by the computing device, the synthesized set of pixels using the updated target direction field.

2. A method as described in claim 1, wherein the input and the subsequent input are brush strokes.

3. A method as described in claim 1, wherein the input and the subsequent input are touch inputs received by a touch sensitive device.

4. A method as described in claim 2, wherein updating the target direction field comprises smoothing an intermediate direction field generated by the subsequent input to create the updated target direction field.

5. A method as described in claim 1, wherein updating the target direction field is performed using a direction diffusion technique.

6. A method as described in claim 1, wherein the source direction field is calculated using color information of pixels of the source texture.

7. A method of controlling example-based texture painting by a computing device, the method comprising:
   receiving, by the computing device, at least one input painting a target shape mask in a user interface that defines a set of pixels to be synthesized;
   synthesizing, by the computing device, the set of pixels using a texture from a source image;

receiving, by the computing device, at least one subsequent input painting an update to the target shape mask that changes the set of pixels to a new set of pixels;

receiving, by the computing device, a user input specifying how wide boundary effects of a texture from a source image are to be applied to edges of the set of pixels and the new set of pixels; and synthesizing, by the computing device, the new set of pixels using the texture from the source image, in which edges of the texture from the source image are used to synthesize pixels around edges of the set of pixels and the new set of pixels such that the pixels around the edges of the set of pixels and the new set of pixels are similar to the edges of the texture from the source image.

8. A method as described in claim 7, wherein the new set of pixels has a boundary that is modification to a boundary of the set of pixels.

9. A method as described in claim 7, wherein the input and the subsequent input are brush strokes.

10. A method as described in claim 9, wherein edges of the texture from the source image are matched to contours of the brush strokes.

11. A method as described in claim 9, wherein the set of pixels and the new set of pixels have coarse shapes that originate from the brush strokes and fine shape details that originate from the texture from the source image.

12. A method as described in claim 7, wherein a binary source shape mask is derived from the texture from the source image and used to synthesize the set of pixels and the new set of pixels.

13. A system of controlling example-based edge-aware directional texture painting, the system comprising:

a means for determining a source direction field and a source shape mask from a source texture;

a means for defining a target shape mask defining a set of pixels to be synthesized and a target direction field for the set of pixels;

a means for synthesizing the set of pixels such that the set of pixels maintains directionality and shape effects of the source texture by comparing the target shape mask and target direction field against the source direction field and source shape mask;

a means for modifying the target shape mask and target direction field to create a modified target shape mask defining a modified set of pixels and a modified source direction field; and a means for synthesizing the modified set of pixels such that the modified set of pixels maintains directionality and shape effects of the source texture by comparing the modified target shape mask and modified target direction field against the source direction field and source shape mask.

14. A system as described in claim 13, wherein the means for defining the target shape mask and the target direction field and the means for modifying the target shape mask and the target direction field comprise receiving brush strokes to a touch sensitive device.

15. A system as described in claim 14, wherein the brush strokes are smoothed to create the target shape mask, the modified target shape mask, the target direction field, and the modified target direction field.

16. A system as described in claim 13, further comprising a means for determining how edge boundary effects of the source texture are to be applied to the set of pixels and the modified set of pixels.

17. A system as described in claim 13, wherein the modified set of pixels contains a group of pixels contained in the set of pixels.

18. A system as described in claim 13, wherein the means for modifying the target shape mask and the target direction field comprises receiving multiple user inputs in a similar location to continually modify the target shape mask and target direction field responsive to each subsequent input.

19. A system as described in claim 13 wherein updating means updates the target direction field using a direction diffusion technique.

20. A system as described in claim 13, wherein the source direction field is calculated using color information of pixels of the source texture.

* * * * *